Holt

[15] 3,683,280
[45] Aug. 8, 1972

[54] SHARK REPELLING DEVICE INCLUDING PULSE GENERATOR PRODUCING ELECTRICAL FIELD IN WATER BETWEEN WIDELY SPACED ELECTRODES

[72] Inventor: John K. Holt, Clearwater, Fla.

[73] Assignee: Electromagnetic Industries, Incorporated, Clearwater, Fla.

[22] Filed: Nov. 9, 1971

[21] Appl. No.: 196,908

Related U.S. Application Data

[63] Continuation-in-part of Ser. No. 64,070, July 27, 1970, abandoned.

[52] U.S. Cl. ...................325/116, 43/17.1, 49/59, 325/118
[51] Int. Cl. ........H05c 1/04, H04b 1/02, A01k 75/00
[58] Field of Search........325/28, 105, 116, 118, 141, 325/164, 169; 307/252; 49/59; 43/17.1

[56] References Cited

UNITED STATES PATENTS 3,164,772   1/1965   Hicks.........................325/118

FOREIGN PATENTS OR APPLICATIONS 713,206   7/1965   Canada......................43/17.1

OTHER PUBLICATIONS

Turner– Semiconductor Devices, pp. 146– 147, 1961.
G.E. SCR Manual, 3rd ed. pp 72-77, 1964.

Primary Examiner—Robert L. Richardson
Attorney—John J. McGlew et al.

[57] ABSTRACT

A sealed, water-proof housing encloses an inverter which is energized from a direct current source, such as a relatively low voltage battery in the housing, and has a secondary winding connected to opposite input terminals of a full wave rectifier, also enclosed in the housing. One DC output terminal of the rectifier is connected directly to an output terminal for a first electrode, and the other DC output terminal is connected to an output terminal for a second electrode. The first and second electrodes are spaced widely apart in the water, as by being trained along opposite edges of a trawl net or "bag." Preferably, two pairs of electrodes are used, with corresponding polarity electrodes being connected to the same output terminal. The housing is attached to the net at a midpoint, with one pair of electrodes extending forwardly and the other pair extending rearwardly. A power capacitor is connected across the DC output terminals, and a variable resistor is connected between one AC input terminal of the rectifier bridge and the gate of the SCR. The SCR, during each alternate half cycle of AC potential applied to the input terminals of the rectifier bridge, is gated conductive through the variable resistor to discharge the power capacitor through the electrodes and the body of water therebetween to establish an electric field in the body of water. The potential across the power capacitor rapidly decreases to a value at which the SCR becomes non-conductive to interrupt the electric field. The charging of the capacitor and the discharge thereof is repeated cyclically. The battery in the housing is re-chargeable.

6 Claims, 2 Drawing Figures

PATENTED AUG 8 1972

3,683,280

INVENTOR.
JOHN K. HOLT

BY

John J. McGlew
ATTORNEY

SHARK REPELLING DEVICE INCLUDING PULSE GENERATOR PRODUCING ELECTRICAL FIELD IN WATER BETWEEN WIDELY SPACED ELECTRODES

CROSS-REFERENCE TO RELATED APPLICATION

This application is a continuation-in-part of application, Ser. No. 64,070, filed July 27, 1970, and now abandoned, for "PULSE GENERATOR."

FIELD OF THE INVENTION

This invention relates to shark repelling devices and, more particularly, to a novel and improved shark repellent device including a pulse generator connected to a pair of widely spaced electrodes to produce an electrical field therebetween serving to repel sharks.

BACKGROUND OF THE INVENTION

Protection against sharks has always been a problem with the fishing industry and, with the increasing popularity of aquatic sports, such as skin diving and the like, the problem has become even more critical. For example, in the fishing industry, it is highly desirable to prevent sharks from entering the open mouths of nets drawn by trawlers, so as to preserve the catch in the nets from devastation by sharks. Also, when fishing for larger fish, such as tuna, the gaffing of a tuna before hauling the tuna completely on board a vessel results in a loss of blood by the tuna, and sharks are attracted so quickly that they are sometimes able to tear off chunks of tuna meat before the tuna can be drawn on board the vessel.

For this reason, numerous attempts have been made at devising shark repelling devices, both for use by fishermen and for use by aquatic sports enthusiasts. Most of the known devices are directed to providing some type of electrical field which will repel a shark or, in some cases, actually kill a shark when the shark enters a certain area of water. The devices have been largely of an electronic nature, and one of the problems has been to provide a shark repellent device, of an electrical nature, which is safely usable in salt water and which, for example, will not be hazardous to humans.

A typical shark repellent device of the prior art is shown and described in Hicks U.S. Pat. No. 3,164,772. The Hicks patent discloses an arrangement wherein a dipole antenna is used to create an electric field which is stated to provide protection against sharks. In one embodiment illustrated in the Hicks patent, a transistorized astable multivibrator is energized from a first relatively low voltage battery providing the operating potential for the transistors, and an additional high voltage battery is also provided, the high voltage battery having a potential of the order of 100 to 150 volts. The high voltage battery is used to charge a capacitor through a switch, and the astable multivibrator is used to pulsatingly trigger a silicon controlled rectifier whose output is connected to the two halves of a dipole antenna.

The Hicks patent states that the dipole antenna, energized by the mentioned circuit, produces a field which is believed to affect certain organs of the shark, resulting in repelling the shark. The repelling or killing of a shark is stated to be not in the form of an electrical shock, but due to some other electrical phenomenon.

Among other aspects of this Hicks patent, the specification denigrates shark repelling devices comprising a pair of electrodes, which may be in the form of grids or meshes, spaced apart a relatively short distance and providing an electrically charged area therebetween. The patent states that such devices are largely limited to use in fresh water, as salt water is so highly conductive as to render the devices inoperative by short-circuiting the electrodes.

While the Hicks shark repellent device has been somewhat effective under certain circumstances, it leaves a great deal to be desired from the standpoint of effective repelling of sharks interfering with fishing, such as entering the mouth of a net drawn by a trawler or the like. As is known, these nets are towed behind the trawler and otter boards are provided to spread the mouth of the net open so as to capture or entrain large quantities of fish. When fish are in the net, sharks are often attracted to these fish and enter the net, greatly reducing the number of fish which can be harvested effectively.

SUMMARY OF THE INVENTION

In accordance with the present invention, a pulse generating circuit is used to produce pulses, at a relatively low frequency, between a pair of widely spaced electrodes of opposite polarity. The pulse is produced by cyclically triggering an SCR conductive to discharge a capacitor across the electrodes immersed in seawater or the like. The pulse generator is energized from a suitable source of DC potential, and will operate on low voltages from a quarter of a volt up to 110 volts, although preferably it is energized by a single low voltage battery and, with an input amperage of about 0.75 ampere, an output voltage of about 150 volts and producing a current of up to 1,500 amperes is provided. The principle of operation of the invention shark repelling device is based on producing a voltage drop across a discrete area of a conductive medium, such as salt water, to produce a current flow across this area, and it has been found, in practice, that the device is extremely effective in preventing sharks from passing through the discrete area, while not having any noticeable effect on other aquatic life, such as commercial fish or food fish which are being netted by a trawler net drawn behind a vessel and having a pair of electrodes, energized in accordance with the invention, mounted on respective otter boards at opposite ends or sides of the open mouth of the net to produce a current flow between the otter boards and across the mouth of the net.

More specifically, one major consideration of the present invention is to use voltage to provide a current flow across a discrete area or pathway through highly conductive water, with a sufficient current flow to create a voltage drop across this discrete pathway. The electrodes are not critical as to length, except for taking into consideration the $I^2 R$ losses along the length, and typical resistance between the electrodes is less than 1 ohm and may be of the order of 0.1 ohm. It is believed that the reason for sharks being repelled from the device of the present invention is due to the voltage drop created across the animal or shark when it is in the vicinity of the device due to the high current levels in the water.

Sharks are known to possess a highly sensitive nervous system, their sensory system being essentially concentrated in their noses. The electrical current stimulus is thought to be the main reason for the deterrent effects of the shark repellent.

The circuit of the present invention is particularly designed to provide a high pulse current efficiently and rather simply to maintain the high current level in the ater. Field experience has yielded hard and fast information as to the necessary voltage and power requirements, to keep sharks at least six feet away from the electrodes or the electrode array, under various conditions. The arrangement of the electrodes, their cross-sectional area and other features have been the subject of experimental research from the standpoint of creating substantial electrical current flows in desired areas of the water. The invention does not rely on any special antenna means for production, transmission, or propagation. It is thus distinguished from the arrangement of the Hicks patent, mentioned above, which uses a dipole antenna. As known to those skilled in the art, a dipole antenna, as well as other types of antennae, is a tuned device, with its size and orientation depending on transmission frequency more than resistance.

As a result of the research conducted with the present invention, it has been discovered that certain types of marine life, particularly sharks and shrimp, are highly sensitive to a pulsating field of a voltage and amperage which are not sufficient to disturb other and frequently much smaller forms of sea life, particularly certain food fish. Thus, a shark repellent device of the type of the present invention, when placed at the mouth of a fishing net, repels sharks without disturbing the normal catch. When used with a submerged trawl net for shrimp, the present invention produces a shock response in the shrimp, causing the shrimp to move out of their burrows into the path of the net.

An object of the invention is to provide an improved device for repelling sharks from a discrete path.

Another object of the invention is to provide such a device which is relatively small, inexpensive, and operable from an internally arranged battery power source contained in a sealed housing enclosing all the electrical and electronic components.

A further object of the invention is to provide such a device which requires relatively few components and which is inherently self-protecting in that no protective current limiting or intermediate charging circuitry is required.

Another object of the invention is to provide such a device which may be supplied with power without the necessity of using large cables or high voltage cables connected to a fishing net, thus eliminating dangers to fishermen incident to the use of such cables.

A further object of the invention is to provide such a device which is readily adaptable to a wide variety of input voltages from a wide variety of sources, and wherein the discharge rate and the pulse frequency rate may be readily varied and controlled.

For an understanding of the principles of the invention, reference is made to the following description of a typical embodiment thereof as illustrated in the accompanying drawings.

DESCRIPTION OF THE PREFERRED EMBODIMENT

Figure 1:
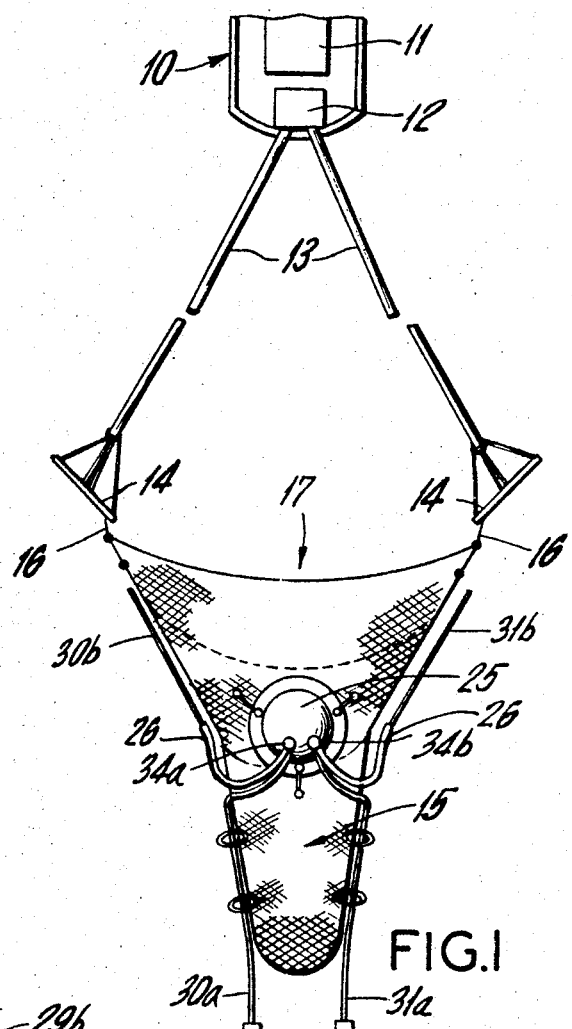
FIG. 1 is a somewhat schematic view illustrating the device of the present invention as applied to a net drawn by a trawler.

Referring to FIG. 1, a trawler or other type of fishing boat is indicated at 10 as having a cabin 11 and being provided with a power winch 12. Cables 13 connect winch 12 to otter boards 14 connected by lines or cables 16 to a net generally indicated at 15 and having an open mouth 17. As known to those skilled in the fishing art, the otter boards 14, upon forward movement of trawler 10, tend to diverge from each other to the extent permitted by their interconnection by cables to thus maintain the mouth 17 of net 15 open.

The pulse generator is contained in a sealed waterproof housing 25 also enclosing a source of DC potential, such as a low voltage vattery. Housing 25 is arranged to be secured to net or "bag" 15 in any suitable manner, such as by snaps or ties. Thus, the housing is designed to accompany the trawl net beneath the surface of the water, thereby eliminating the need for heavy cables, carrying the current, and extending perhaps several hundred feet beneath the surface of the water.

Housing 25 has externally accessible outlet terminals 34a and 34b which are the output terminals of the pulse generator sealed in the housing 25. Respective electrodes 30a and 31a are connected to outlet terminals 34a and 34b. These electrodes, which are of opposite polarities, are trained through nylon rings or loops 18, secured along opposite sides of net 15, so as to extend in a trailing direction. In the illustrated example, a second pair of opposite polarity electrodes 30b and 31b are connected to terminals 34a and 34b, respectively and extend toward net opening or mouth 17. At their connections to outlet terminals 34a and 34b, all the electrodes are firmly tied together and to net 17.

The electrodes of each pair are spaced widely apart, except at their ends connected to outlet terminals 34a and 34b. For example, the spacing between the electrodes of each pair may be as much as 12 feet. Electrodes 30a and 31a are preferably copper brain over a rope and supply conductor core. On the other hand, when the additional electrodes 30b and 31b are used, these preferably are 14–18 gauge wires about 30–35 feet long, including insulation 26 for about 12 feet from the outlet terminals and about 20 feet with the insulation removed.

At this point, it may be noted that application, Ser. No. 64,070, filed July 27, 1970 and now abandoned, and which is a continuation of application, Ser. No. 691,610, filed Dec. 18, 1967 and also now abandoned, incorrectly shows and describes the elements designated 18 as receptacles containing pulse generators, and as each having a pair of opposite polarity electrodes 30, 31 extending therefrom. The incorrect illustration and description in application, Ser. No. 64,070 was derived from the incorrect illustration and description in application, Ser. No. 691,610.

Figure 2:
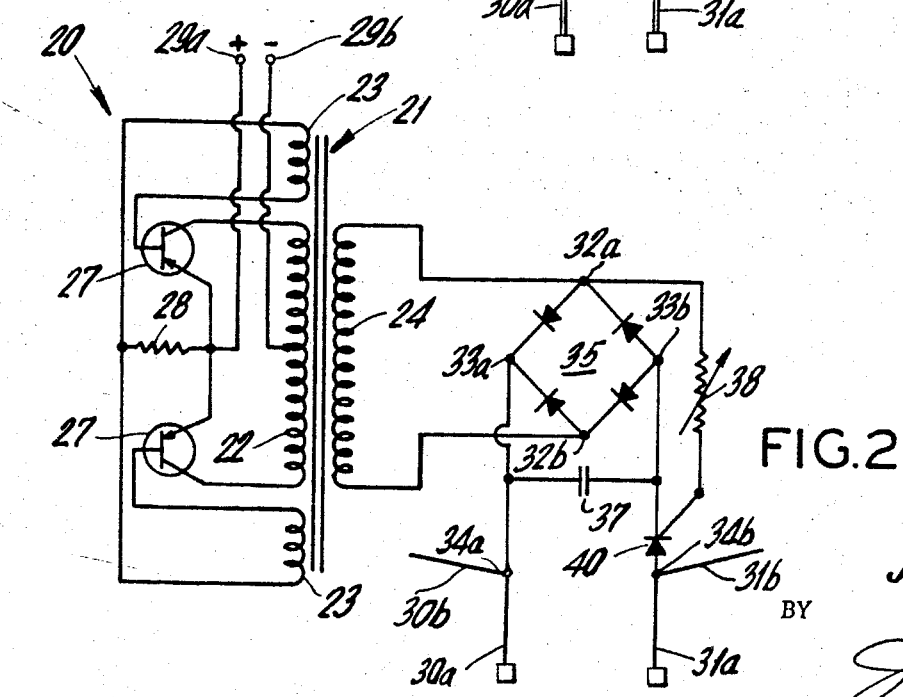
FIG. 2 is a schematic wiring diagram of a shark repellent device embodying the invention.

Referring to FIG. 2, the pulse generator, enclosed in water-proof housing 25, includes an invertor 20, a full wave rectifier bridge 35, a capacitor 37, a variable resistance 38 and an SCR 40. Inverter 20 includes an iron core transformer 21 having primary windings 22 and 23 and a secondary winding 24. The inverter further includes a pair of substantially identical transistors 27 and a resistance 28.

The input to the pulse generator is applied to positive terminal 29a and negative terminal 29b and, in the particular example illustrated in FIG. 1, this input is a battery contained in housing 25 and rechargeable from the usual 32-volt supply available aboard a trawler such as the trawler 10. Input terminal 29a is connected, at a common junction point, to the emitters of transistors 27 and to resistor 28. Input terminal 29b is connected to the midpoint of transformer primary winding 22, and the collectors of transistors 27 are connected to respective opposite ends of primary winding 22. The other terminal of resistor 28 is commonly connected to the outer terminals of transformer winding 23, and the inner terminals of transformer windings 23 are connected to the bases of transistors 27.

Responsive to the application of an input potential to terminals 29a and 29b, inverter 20 induces an AC potential in secondary winding 24 of transformer 21. The opposite terminals of secondary winding 24 are connected to the AC input terminals 32a and 32b of rectifier bridge 35. One DC output terminal 33a of rectifier bridge 35 is connected, by a conductor 36a, to an output terminal 34a of the pulse generator. The other DC output terminal 33b of rectifier bridge 35 is connected by a conductor 36b to one terminal of SCR 40, and the opposite terminal of SCR 40 is connected to the other output or outlet terminal 34b of the pulse generator. The outlet terminals 34a and 34b are electrically connected to the respective electrodes 30 and 31. Gating of SCR 40 is controlled by the adjustable resistance 38 which is connected between AC input terminal 32a of rectifier bridge 35 and the gate electrode of SCR 40.

Inverter 20 converts the potential at input terminals 29a and 29b into a low frequency AC potential applied to the primary windings of transformer 21. For example, the frequency may be about 200 cycles per second. In turn, secondary winding 24 of transformer 21 applies this AC potential to the AC input terminals 32a and 32b of rectifier bridge 35, and a DC voltage appears at the DC output terminals 33a and 33b of rectifier bridge 35. This DC output voltage charges condenser 27 so that its left hand plate becomes positive and its right hand plate becomes negative. During one-half of each cycle of the AC potential applied to rectifier bridge 35, the voltage applied to the gate of SCR 40, through variable or adjustable resistance 38, triggers SCR 40 conductive to discharge condenser 37 to provide a current flow between electrodes 30 and 31. As the condenser is discharged, its voltage decreases very rapidly, as known to those skilled in the art, so that the potential between the anode and cathode of SCR 40 is rapidly reduced to such a low value that SCR 40 ceases to conduct. After about 100 microseconds, SCR 40 is blocked until it is again triggered conductive by a gating signal applied to adjustable resistance 38. This gating signal is applied once during each alternate half cycle of the AC potential.

As mentioned, the invention device is used in conjunction with a power supply independent of vessel 10. As an illustration, a power supply such as a nickel-cadmium battery is incorporated directly into the water-tight casing 25. When the invention is used in this manner, the casing 25 may be submerged, floated, or attached directly to the trawl net 15 in such position as may be desired.

The poor regulation of inverter circuits with changing loads is used to advantage to charge capacitor 37 without any intermediate charging circuitry. When working into a low impedance load, the inverter puts out only low voltage, acting as a constant current device. As the capacitor charges, its impedance rises and the inverter output voltage rises. The rate of charge is controlled by the base drive circuit of inverter 20.

In the selected embodiment of the device, the original DC potential is converted to a pulse output with a peak voltage of approximately 150 volts DC and about 15 amperes, into a load of 0.1 ohms in the water present between electrodes 30 and 31. A suitable pulse rate is about one pulse per second.

When the device is utilized with a 5-volt nickel-cadmium battery incorporated directly in the water-tight casing 25, it develops a pulse output with a peak voltage of 50 volts into electrodes which may be worn directly on the human body. This embodiment of the invention is most useful in underwater work, as a shark repellent device.

The battery power supply is made rechargeable, without external electrical connections, by means of an inductive charging system in which the battery is connected through a full wave rectifier bridge to the secondary winding on a transformer core. The primary winding, on a matching core, is external to the water-tight casing and not connected to it in any way except magnetically. The charging rate is fixed by the gap between the cores and is designed to suit the particular batteries which power the pulse generator.

To improve the reliability and usefulness of the device in a marine environment, the means for turning it on and off also may be controlled by an external magnetic field.

Silicon controlled rectifier 40 is gated by the charging voltage, either before or after rectification, and the point at which the rectifier is gated may be adjusted by resistor 38. Thus the voltage and pulse rate can be set where desired by adjusting the charge rate through the transistors 27, of the base circuit resistance, and the gating point with the gate resistor 38.

As mentioned above, the resultant pulsed electrical field has profoundly disturbing effect on sharks in particular, and tends to divert them from the mouth of the net when the device is sued as illustrated in FIG. 1.

The circuitry of the device, while having particular utility in the described embodiment, may also be employed with low voltage sea-water batteries for personal protection from shark attack, shark protection for any underwater fishing gear, diver, or area and, as previously mentioned in connection with shrimp burrowed in the bottom, for stimulating the shrimp to aid in their capture, as well as for the stimulation of other marine life. The pulse generator, per se, is also useful when using pulsed sound, as in fathometers, sonar and the like, where low frequency transducers are energized by a capacitor discharge.

In actual practice, electrodes 30 and 31, or the corresponding arrays of parallel connected electrodes, of opposite polarity as to each array, are spaced apart a distance of the order of 8 to 10 feet, and may be spaced apart a distance of twelve feet or more, depending on the circumstances. This is in contrast to prior art arrangements, such as the arrangement shown in Hicks U.S. Pat. No. 3,164,772, mentioned above, and in which the field is created by a dipole antenna whose two halves are either contiguous or extremely close to each other.

From the foregoing description, it will be clear that the invention provides an improved shark repelling device which does not require an independent external electric generator or power source, which eliminates the use of large electric cables attached to trawl nets, and which provides an electric filed extending along a discrete path between widely spaced electrodes of opposite polarity and effective to repel sharks attempting to cross this path.

While a specific embodiment of the invention has been shown and described in detail to illustrate the application of the principles of the invention, it will be understood that the invention may be embodied otherwise without departing from such principles.

What is claimed is:

1. A shark repelling device comprising, in combination, a self-contained source of low frequency AC potential having a pair of output terminals; a full-wave rectifier bridge having a pair of AC input terminals, connected to said output terminals, and a pair of DC output terminals; a power capacitor connected across said DC output terminals; an SCR having one of its anode and cathode terminals connected to one terminal of said capacitor for discharging said capacitor; a variable resistor connected between one of said AC input terminals and the gate of said SCR for supplying the firing voltage of said SCR; at least one first electrode connected to the other terminal of said capacitor; at least one second electrode connected to the other of the anode and cathode terminals of said SCR; said first and second electrodes extending into the surrounding body of water and, in use of said shark repelling device, being spaced apart by a distance of the order of ten feet; said SCR, during each alternate half cycle of AC potential applied to said AC input terminals of said rectifier bridge, being gated conductive through said variable resistor to discharge said power capacitor through said electrodes and the body of water therebetween to establish said electric field in the body of water between said first and second electrodes, with the potential across said power capacitor rapidly decreasing to a value at which said SCR becomes non-conductive to interrupt the electric field.

2. A shark repelling device, as claimed in claim 1, in which said self-contained source of low frequency AC potential comprises a single source of low voltage DC potential; and an inverter having DC input terminals, connected to said source of DC potential, and a pair of AC output terminals connected to said AC input terminals of said full-wave rectifier.

3. A shark repelling device, as claimed in claim 2, in which said inverter is a transistorized inverter.

4. A shark repelling device, as claimed in claim 1, including a water-tight sealed housing enclosing all of said components except said electrodes; said electrodes extending in sealed relation from said housing.

5. A shark repelling device, as claimed in claim 4, in which said sealed housing is secured to a trawl net arranged to be drawn behind a fishing vessel and connected to the fishing vessel by cables; said first and second conductors extending along respective opposite sides of said net from said sealed housing; said electrodes extending from respective exterial outlet terminals on said sealed housing connected to said output terminals of said source of low frequency AC potential, in sealed relation.

6. A shark repelling device, as claimed in claim 1, including plural first electrodes commonly connected, in parallel to each other, to said other terminal of said capacitor, and plural second electrodes commonly connected, in parallel to each other, to said other of the anode and cathode terminals of said SCR.

* * * * *